(12) United States Patent
Clark et al.

(10) Patent No.: US 10,873,721 B1
(45) Date of Patent: *Dec. 22, 2020

(54) CUSTOMIZED GRAPHICS FOR VIDEO CONVERSATIONS

(71) Applicant: Facebook, Inc., Menlo Park, CA (US)

(72) Inventors: Jason Duane Clark, Woodinville, WA (US); Brendan Benjamin Aronoff, San Francisco, CA (US); Stephane Taine, Issaquah, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/553,788

(22) Filed: Aug. 28, 2019

Related U.S. Application Data

(63) Continuation of application No. 16/174,257, filed on Oct. 29, 2018, which is a continuation of application No. 15/479,370, filed on Apr. 5, 2017, now Pat. No. 10,158,828.

(51) Int. Cl.
*H04N 5/445* (2011.01)
*H04N 7/15* (2006.01)
*H04N 7/14* (2006.01)

(52) U.S. Cl.
CPC ......... *H04N 5/44504* (2013.01); *H04N 7/147* (2013.01); *H04N 7/152* (2013.01)

(58) Field of Classification Search
CPC combination set(s) only.
See application file for complete search history.

(56) References Cited

U.S. PATENT DOCUMENTS

| | | | |
|---|---|---|---|
| 7,227,976 B1 | 6/2007 | Jung et al. | |
| 2004/0125423 A1 | 7/2004 | Nishi et al. | |
| 2005/0231588 A1 | 10/2005 | Yang et al. | |
| 2007/0200925 A1 | 8/2007 | Kim | |
| 2009/0033737 A1 | 2/2009 | Goose et al. | |
| 2010/0199340 A1* | 8/2010 | Jonas | G06Q 10/10 726/8 |
| 2011/0292075 A1 | 12/2011 | Sukenori | |
| 2013/0316735 A1 | 11/2013 | Li et al. | |
| 2015/0091891 A1* | 4/2015 | Raheman | A63G 31/16 345/419 |
| 2015/0206310 A1 | 7/2015 | Okada et al. | |
| 2017/0132873 A1 | 5/2017 | Walker et al. | |

* cited by examiner

*Primary Examiner* — Phung-Hoang J Nguyen
(74) *Attorney, Agent, or Firm* — Fenwick & West LLP

(57) ABSTRACT

An online system customizes video conversations between users of the online system. During a video conversation, the online system presents a composite view to the participating users. The composite view may include visual representations of the users, a background graphic, or other types of graphics such as masks and props that the users can wear or interact with in the environment of the video conversation. The visual representations may be generated based on a live video feed of the users or include avatars of the users. The online system can determine the graphics based on information about the users. For instance, the online system determines a background graphic showing a location that the users have each visited. Upon viewing the background graphic, the users may be encouraged to interact with the background graphic or other graphics included in the composite view, which can promote an engaging video conversation experience.

20 Claims, 7 Drawing Sheets

320

340

360

400

```
Identify users participating in a video conversation, each user
having a client device presenting a display
410
        │
        ▼
In response to a selection for a background graphic, provide
the background graphic to be included in the displays
420
        │
        ▼
Determining graphics based on the background graphic
430
        │
        ▼
For each client device, provide one or more of the graphics to
be included in the display
440
        │
        ▼
In response an interaction with a graphic performed by a user,
modify the display of the user
450
```

FIG. 4

CUSTOMIZED GRAPHICS FOR VIDEO CONVERSATIONS

CROSS REFERENCE TO RELATED APPLICATIONS

This application is continuation of U.S. patent application Ser. No. 16/174,257, filed Oct. 29, 2018, which is continuation of U.S. patent application Ser. No. 15/479,370, filed Apr. 5, 2017, now U.S. Pat. No. 10,158,828, each of which is incorporated herein by reference in its entirety.

BACKGROUND

This disclosure generally relates to providing graphics for video conversations and in particularly to customizing the graphics for particular users of an online system.

Users of an online system may communicate in real-time using video conversations. For example, two users each have a smartphone device that includes a camera, microphone, and speaker that enable the two users to talk to each other and see a video feed of each other. Existing systems that facilitate video conversations may not provide a particularly engaging user experience that is customized based on the participating users. For example, the two users are friends participating in the video conversation from their home or office. After catching up on each other's day, the friends run out of topics to discuss with one another, which may result in awkward silences. Thus, the friends may stop the video conversation or feel unsatisfied with the video conversation and system overall. It is desirable for an online system to provide engaging video conversations in order to encourage users to continue using services of the online system.

SUMMARY

An online system customizes video conversations between users of the online system. Users participate in a video conversation using client devices, and during the video conversation, the online system can present composite views to the participating users via displays of the client devices. A composite view may include visual representations of the users, a background graphic, or other types of graphics such as masks and props that the users can wear or interact with in the environment of the video conversation. The visual representations may be generated based on a live video feed of the users captured by the client devices and/or include avatars of the users (e.g., a "cartoonized" visual representation). Because many different types of graphical content may be used in conjunction with the live video feed, as used herein a "background graphic" represents graphical content that appears behind other content in the live video feed such as a user or a user's avatar in the composite view, while "graphics" represent other graphical content that may appear in the foreground and obscure other features of the video feed, for example as either imposed on top of a background graphic or in front of a user or a user's avatar.

The online system can determine additional graphics to include in the composite views based on information about the users. For instance, based on actions performed by the users on the online system or a third party system, the online system determines a background graphic showing a geographical location that the users have each visited. Upon viewing the background graphic, the users may be encouraged to interact with the background graphic or other graphics included in the composite view, which can promote an engaging video conversation experience. Further, third party systems may provide graphics to the online system that include sponsored content for presentation to users during video conversations.

In one embodiment, a method identifies users of the online system participating in a video conversation, where each user has a client device presenting visual representations of one or more of the users. In response to receiving a selection from one of the users for a background graphic, and for each of the users, the online system provides the background graphic to be included in a composite view presented by the corresponding client device of the user. The composite view overlays the visual representations of the one or more users on the background graphic. The online system determines a first set of graphics for a first user of the users. Each of the graphics is associated with one or more designated portions of the composite view presented by the client device of the first user. The online system provides one or more graphics of the first set to be included in the composite view presented by the client device of the first user. In response to receiving an interaction performed by the first user with a graphic of the one or more graphics, the online system modifies the composite view presented by the client device of the first user. For instance, the online system overlays the graphic on the one or more designated portions of the composite view corresponding to the graphic.

BRIEF DESCRIPTION OF DRAWINGS

FIG. 4 is a flowchart illustrating a process for customizing graphics for video conversations according to one embodiment.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
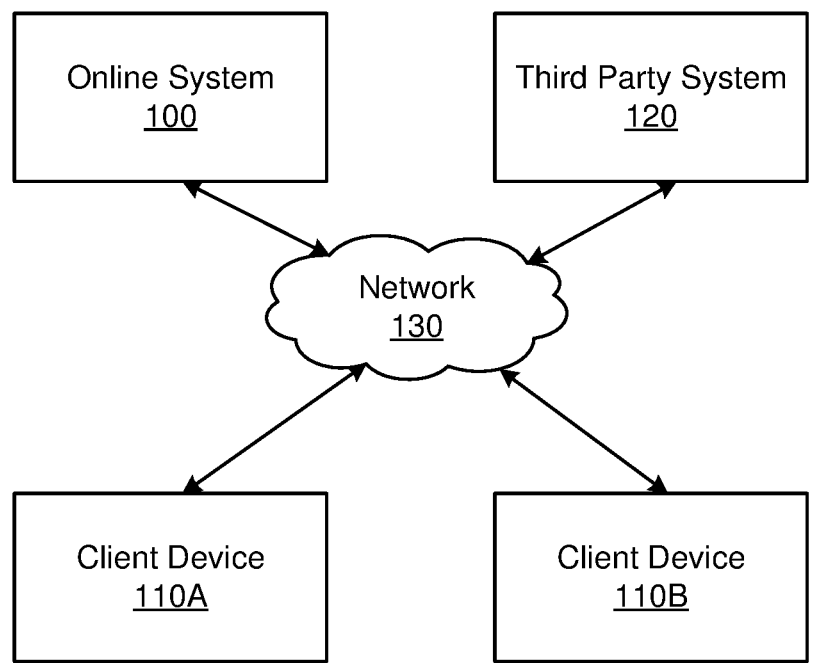
FIG. 1 is a diagram of a system environment for customizing graphics for video conversations according to one embodiment.

Figure (FIG. 1 is a diagram of a system environment for customizing graphics for video conversations according to one embodiment. The system environment includes an online system 100, one or more client devices such as client device 110A and 110B, and one or more third party systems 120, connected to each other via a network 130. The client devices 110A and 110B may be collectively referred to herein as client devices 110, or individually as a client device 110. In other embodiments, different and/or additional entities can be included in the system environment.

The online system 100 allows users of the online system 100 to communicate or otherwise interact with each other and access content. The online system 100 receives information about the users, for example, user profile information and information about actions performed by users on the online system 100 or a third party system 120. The online system 100 enables users to participate in video conversations with each other. In addition to displaying visual representations of the participating users, the online system 100 can also display background graphics and/or other types of graphics during the video conversations. The graphics may be based on content items provided by information from third party systems 120.

In some embodiments, the online system 100 is a social networking system. Users join the online system 100 and add connections to other users to which they desire to be connected (e.g., friends, co-workers, and family members). The online system 100 may also enable users to explicitly express interest in objects and/or concepts, such as brands, products, celebrities, hobbies, sports teams, music, and the like. These interests may be used in a myriad of ways, including targeting graphics and personalizing the user experience (e.g., video conversations) on the online system 100 by showing relevant graphics based on shared interests, affinities, or sentiments.

In some embodiments, the online system 100 maintains and stores a social graph to represent concepts and actions in the online system 100. The social graph includes nodes connected by a set of edges. Nodes represent users and other objects of the online system 100, such as web pages embodying concepts and entities, and edges connect the nodes. Each edge represents a particular interaction or connection between two nodes, such as a user expressing an interest in a content item shared by another user. As another example, an edge may represent a connection (e.g., a friendship type relationship) established between two users. As such, the social graph includes data representative of the social signals of the online system 100. In one embodiment, the online system 100 generates the edges of the social graph based on the observed actions of its users.

The client device 110 is a computing device capable of receiving user input as well as transmitting and/or receiving data via the network 130. In one embodiment, a client device 110 is a conventional computer system, such as a desktop or laptop computer. Alternatively, a client device 110 may be a device having computer functionality, such as a personal digital assistant (PDA), a mobile telephone, a smartphone, head-mounted display (HMD), virtual reality (VR) or augmented reality (AR) device, or another suitable device. A client device 110 is configured to communicate via the network 130. Client devices 110 may include electronic displays, cameras, microphones, speakers, and/or other components that enable users to participate in video conversations using the client devices 110. These components may also be external devices communicatively coupled to client devices 110. For example, an external video camera (e.g., a webcam) may be coupled to a client device 110 to capture a video feed, or an external display or projector may be coupled to a client device 110 to present video from received by the client device 110.

In one embodiment, a client device 110 executes an application allowing a user of the client device 110 to interact with the online system 100 or a third party system 120. For example, a client device 110 executes a browser application to enable interaction between the client device 110 and the online system 100 via the network 130. In another embodiment, a client device 110 interacts with the online system 100 through an application programming interface (API) running on a native operating system of the client device 110, such as IOS® or ANDROID™.

In one embodiment, a third party system 120 is an application provider communicating information describing applications for execution by a client device 110 or communicating data to client devices 110 for use by an application executing on the client device 110. In other embodiments, a third party system 120 provides content, graphics, or other information for presentation via a client device 110. Each third party system 120 is associated with a server outside of the domain of the online system 100. In one embodiment, the third party system 120 communicates content (e.g., graphics or HTML code) from a server of the third party system 120 to a server of the online system 100. The content may be created by the entity that owns the third party system 120. Such an entity may be a company or other type of organization offering a product (e.g., a tangible object or an intangible service), or message that the company wishes to promote.

The network 130 includes any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

II. Example System Architecture

Figure 2:
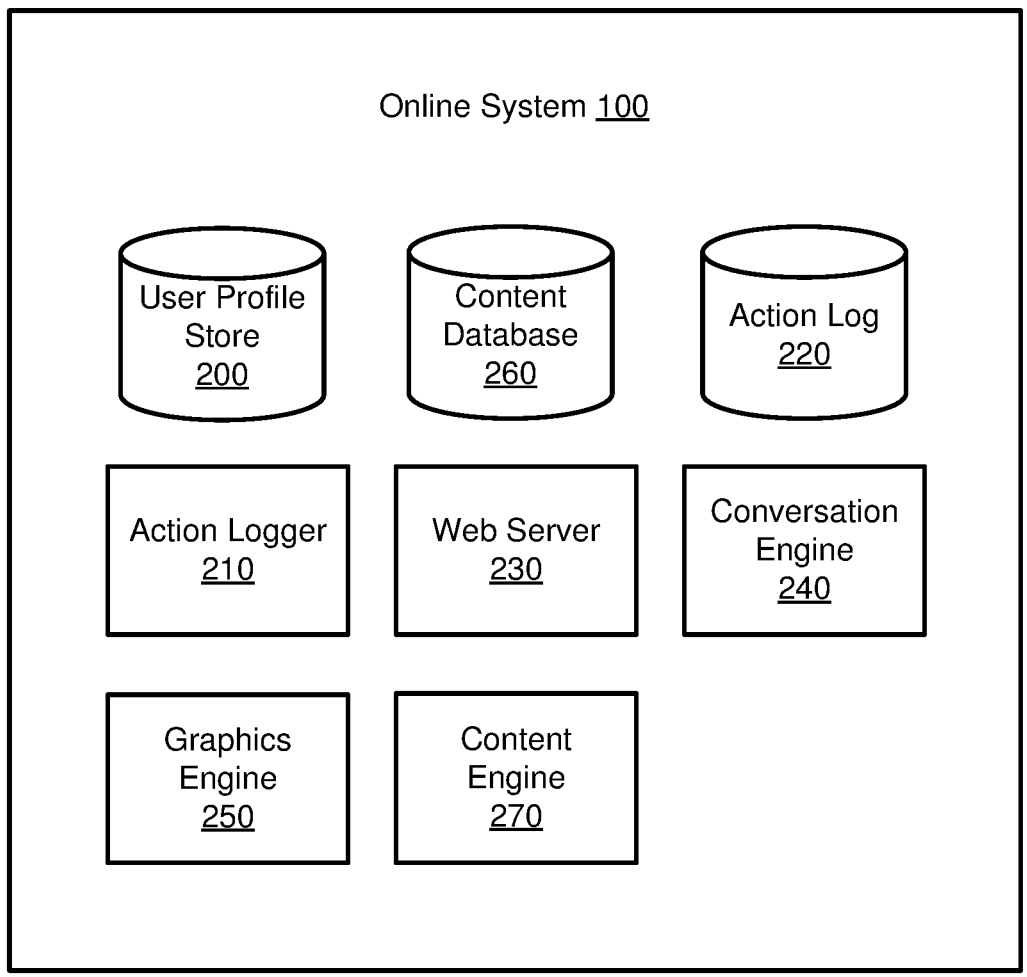
FIG. 2 is a block diagram illustrating the system architecture of an online system according to one embodiment.

FIG. 2 is a block diagram illustrating the system architecture of the online system 100 according to one embodiment. The online system 100 includes a user profile store 200, action logger 210, action log 220, web server 230, third party tracker 235, conversation engine 240, graphics engine 250, and graphics data store 260. In other embodiments, the online system 100 may include additional, fewer, or different components for various applications. Conventional components such as network interfaces, security functions, load balancers, failover servers, management and network operations consoles, and the like are not shown so as to not obscure the details of the system architecture.

The user profile store 200 stores user profiles associated with each user of the online system 100. A user profile includes declarative information about the user that was explicitly shared by the user and may also include profile information inferred by the online system 100. In one embodiment, a user profile includes multiple data fields, each describing one or more attributes of the corresponding user of the online system 100. Examples of information stored in a user profile include biographic, demographic (e.g., age or gender), and other types of descriptive information, such as work experience, educational history, geographical location, hobbies or preferences, location and the like.

A user profile may also store other information provided by a user, for example, images or videos of a geographical location visited by the user. In certain embodiments, an image or video of user(s) may be tagged with identification information of users of the online system 100 displayed in the image or video. A user profile in the user profile store 200 may also maintain references to actions by the corresponding user performed on the online system 100 or on a third party system 120. The user profile store 200 can further store data (e.g., a social graph) describing one or more relationships between different users and allows users to specify their relationships with other users.

The user profile store 200 can store user profiles associated with individuals, as well as user profiles associated with entities such as businesses or organizations, e.g., that own a third party system 120. This allows an entity to establish a presence on the online system 100 for connecting and exchanging content with other users of the online system 100. The entity may post information about itself, about items associated with the entity, for example, products offered by the entity, or provide other information to users of the online system 100 using a brand page associated with the entity's user profile. Users of the online system 100 may connect to the brand page to receive information posted to the brand page or to receive information from the brand page. A user profile associated with the brand page may include information about the entity itself, providing users with background or informational data about the entity.

The action logger 210 receives communications about user actions internal to and/or external to the online system 100, populating the action log 220 with information about user actions. Examples of actions include adding a connection to another user, participating in a video conversation with another user, interacting with graphics during a video conversation, checking-in to physical locations, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 100 to track and record user actions on the online system 100, as well as actions on third party systems 120 that communicate information to the online system 100. In some embodiments, the online system 100 uses data from the action log 220 to infer interests or preferences of a user. Thus, the online system 100 can augment user information stored in the user profile store 200 and determine a more complete understanding of user preferences. The action log 220 can record information about client devices 110 that a user uses to interact with the online system 100. For example, the action log 220 records whether the user used a laptop computer or smartphone client device (or an electronic display 140) to interact with the online system 100. Further, the action log 220 may include information about the types of client devices 110, e.g., smartphone running an IOS® or ANDROID™ operating system.

The web server 230 links the online system 100 via the network 130 to the client devices 110. The web server 230 can serve images, video, and web pages, as well as other web-related content, such as JAVA®, FLASH®, XML and so forth. The web server 230 may receive and route messages between the online system 100, a client device 110, for example, instant messages, queued messages (e.g., email), text messages, short message service (SMS) messages, or messages sent using any other suitable messaging technique. A user may send a request to the web server 230 to upload information (e.g., images or videos) that are stored in the user profile store 200. Additionally, the web server 230 may provide application programming interface (API) functionality to send data directly to native client device operating systems, such as IOS®, ANDROID™, WEBOS® or RIM®.

The third party tracker 235 receives information from third party systems 120 and stores the received information in the user profile store 200, action log 220, or graphics data store 260. The third party tracker 235 can periodically send a request for third party information to a third party system 120. The third party system 120 provides the third party information in response to receiving the request. Third party systems 120 can also provide third party information proactively to the third party tracker 235 without requiring a request.

In one embodiment, the third party tracker 235 receives information from third party systems 120 using pixel tracking. The third party tracker 235 provides a pixel to a third party system 120 to be included in a user interface associated with the third party system 120. The third party system 120 provides third party information to the third party tracker 235 in response to a user of the online system 100 viewing the pixel of the user interface. For example, the pixel is included in a user interface displaying a website of the third party system 120. When the client device 110 of the user displays the pixel of the website on the display screen of the client device, the third party system 120 provides third party information to the third party tracker 235 indicating that the user viewed the website.

The conversation engine 240 enables users of the online system 100 to communicate with each other via video conversations using client devices 110. In an example use case, a user initiates a video conversation and invites one or more other users to join the video conversation. The conversation engine 240 provides notifications to the invited users to join the video conversation. During the video conversation, the conversation engine 240 provides a real-time display (e.g., a video display) for presentation on the client devices 110 of the users participating in the video conversation. The display may include visual representations of the participating users, as well as a background graphic and/or other types of graphics. The conversation engine 240 can also provide real-time audio messages to the client devices 110 during the video conversation. In some embodiments, the conversation engine 240 provides a digital environment, e.g., a VR or AR environment, for users to communicate with one another.

The graphics engine 250 generates and provides composite views to be included in displays presented on users' client devices 110 for video conversations. The composite view may include one or more visual representations of the participating users, one or more background graphics, and/or other types of additional graphics. The graphics engine 250 can analyze information stored in the user profile store 200 or action log 220 to identify information useful for generating graphics. The graphics engine 250 may also receive graphics generated by a third party system 120. The graphics engine 250 can store graphics in the graphics data store 260 or retrieve graphics from the graphics data store 260. In some embodiments, graphics may include sponsored content, e.g., associated with a third party system 120.

The graphics engine 250 may determine graphics to be included in composite views based on information about the participating users from the online system 100. For example, the graphics engine 250 retrieves user information from the user profile store 200 or action log 220 describing actions performed by the users on the online system 100 or a third party system 120. Based on the user information, the graphics engine 250 determines a common characteristic of the users, in some embodiments. For instance, the common characteristic indicates a geographical location visited by each of the users. The graphics engine 250 can determine a background graphic that visually represents the geographical location, e.g., the background graphic shows a beach in Hawaii that a user visited for vacation with the user's family members. The graphics engine 250 determines that the user visited the beach, for example, based on user information indicating that the user checked-in at tourist attraction at the beach, or information from the third party tracker 235 indicating that the user completed a reservation at a hotel or restaurant nearby the beach.

In some embodiments, graphics (and/or background graphics) are associated with one or more targeting criteria, e.g., specified by a third party system 120 or the online system 100. The targeting criteria specify one or more characteristics of users eligible to be presented with the associated graphic. For example, targeting criteria are used to identify users having user profile information, relevant edges of a social graph, or actions satisfying at least one of the targeting criteria. For example, targeting criteria identifies users that have taken a particular action, such as visiting a geographical location, "liked" a brand page of a third party system 120, acquired or reviewed a product or service, installed an application, or performed any other suitable action. Including actions in targeting criteria allows the graphics engine 250 to further refine users eligible to be presented with certain graphics.

In some embodiments, the graphics engine 250 determines characteristics that differ between the users participating in a video conversation and customizes graphics in the corresponding composite views presented on each user's client device 110. For example, the graphics engine 250 determines that a first user has an affinity for fruit smoothies based on user information from the action log 220 indicating that the first user "liked" a brand page of a third party system 120 that provides fruit smoothies. In addition, the graphics engine 250 determines that a second user has an affinity for coffee based on user information from the user profile store 200 and/or action log 220 indicating that the user frequently uploads images of different types of coffee (e.g., Espressos or Cappuccinos) and that the user is connected to other users of the online system 100 who also upload images of coffee. Thus, based on the difference in the first and second users' affinities for beverages, the graphics engine 250 determines to include a graphic of a fruit smoothie in the composite view presented on the first user's client device 110, and to include a graphic of a coffee in the composite view presented on the second user's client device 110. The graphic of the fruit smoothie may include a logo of the third party system 120 that provides fruit smoothies, e.g., to promote the third party system 120 or to increase the likelihood that the first user will interact with the graphic. In this way, in one embodiment different graphics and/or background graphics may be selected for each user according to that user's interests and affinities.

In some embodiments, graphics including sponsored content have corresponding graphics values. For instance, a graphic value of a graphic indicates an amount of compensation to be provided by a third party system 120 (e.g., associated with the graphic) to the online system 100 if the online system 100 presents the graphic to a user during a video conversation. The amount of compensation may be provided if any suitable condition is satisfied when the graphic is presented to a user, e.g., if the online system 100 provides the graphic for presentation in a set of candidate graphics, if the online system 100 presents the graphic in a designated portion of a composite view, if the online system 100 receives an indication that a user performed a particular interaction with the graphic, or interacted with the graphic for a threshold duration of time. In some embodiments, the graphics engine 250 determines an expected value to the online system 100 of presenting a graphic by multiplying the associated graphic value by a probability of a user interacting with the graphic.

The graphics engine 250 can request graphic values from third party systems 120 when there is an impression opportunity to include a background graphic or another type of graphic in a display for a video conversation between users of the online system 100. For example, the background graphic of a composite view presented during the video conversation includes one or more designated portions to display sponsored content. The composite view also includes a number of graphics to display sponsored content. Third party systems 120 may want to promote a product or service to the users participating in the video conversation. Thus, the third party systems 120 provide graphic values to the online system 100 for one or more of the opportunities. The graphics engine 250 can select a graphic value for a given impression opportunity, for example, by determining the graphic value with the greatest amount of compensation.

The graphics engine 250 requests a graphic (e.g., if not already provided) from the third party system 120 that provided the selected graphic value, and includes the requested graphic in the composite view. The graphics engine 250 may select graphic values from multiple third party systems 120 for a given video conversation having more than one impression opportunity to include graphics. If the graphics engine 250 does not receive a graphic value to fulfill each available impression opportunity, or decides not to select any received graphic value, the graphics engine 250 may select a graphic (e.g., a "default graphic") from the graphics data store 260.

The graphics engine 250 can provide information describing impression opportunities to include graphics in displays for video conversations to third party systems 120, e.g., when requesting graphic values from the third party systems 120. The information may describe user information of the users participating in a given video conversation, the time of day during which the given video conversation is occurring, or characteristics of a graphic (e.g., size, orientation, duration in time to be presented, background graphic or a graphic in the foreground, etc.), or any other details that may be useful for third party systems 120 to determine graphic values. The user information may indicate a determined common characteristic of the participating users and/or characteristics that differ between the participating users.

III. Example Customized Graphics for Video Conversations

For sake of example, the description for FIG. 3A-D refers to an example pair of users, Jason and Brendan, of the online system 100 participating in a video conversation. Jason and Brendan use client device 110A and client device 110B, respectively, to communicate with each other during the video conversation. The features described herein with reference to examples with Jason and Brendan may also be included in other embodiments of the invention.

Figure 3A:
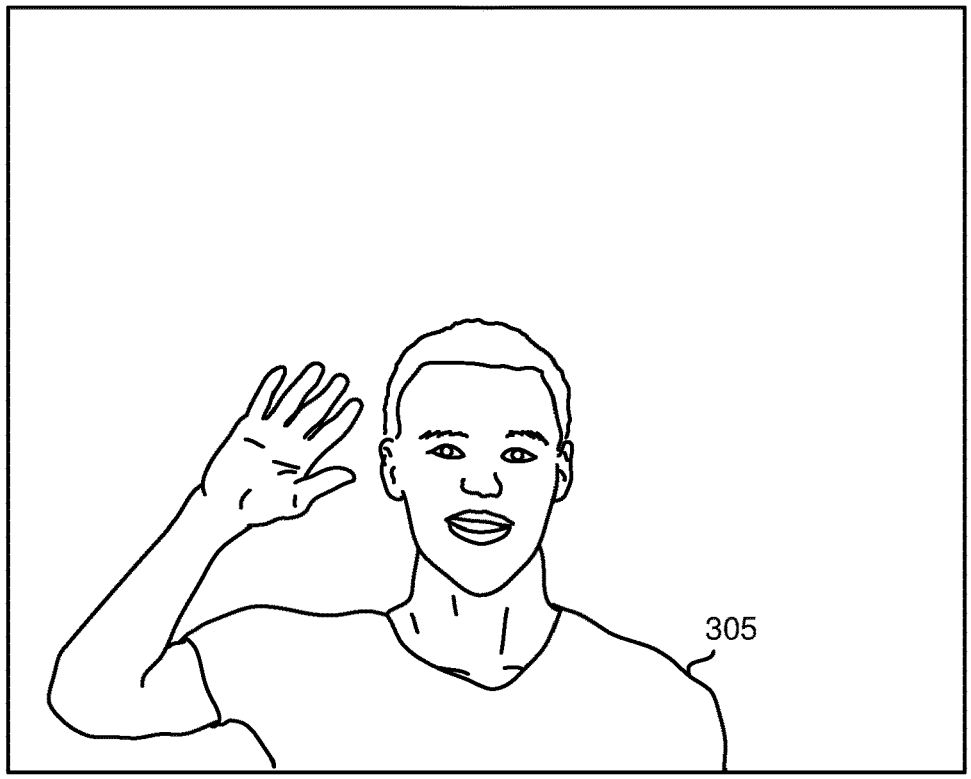
FIG. 3A is a diagram of a display of users of the online system participating in a video conversation according to one embodiment.
Figure 3A:
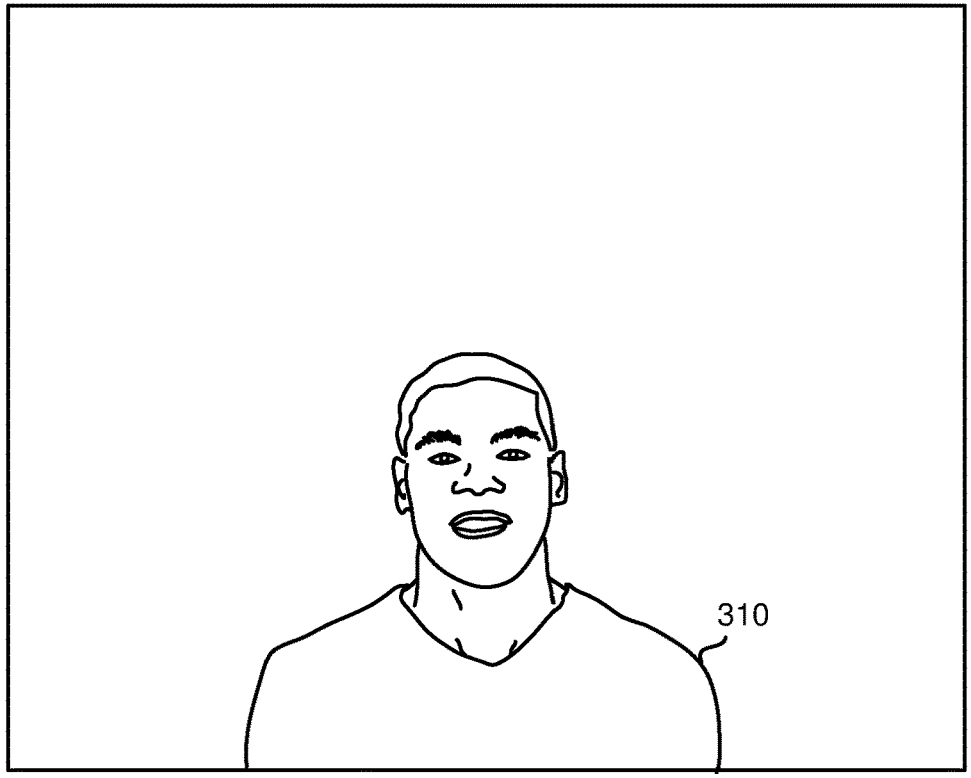

FIG. 3A is a diagram of a display 300 of users of the online system 100 participating in a video conversation according to one embodiment. The display 300 has a first sub-display 305 including a visual representation of Jason and a second sub-display 310 including a visual representation of Brendan. The graphics engine 250 generates the visual representations based on a real-time video feed of the client devices 110A and 110B, in some embodiments. For example, the client devices 110A and 110B each have a camera that captures video feed of the corresponding user. In some embodiments, the graphics engine 250 may modify the video feed, e.g., by generating a "cartoonized" version of the users such as an avatar, or by applying other image processing techniques such as color filters. In addition, the visual representations may be a hybrid "cartoonized" version, e.g., the face of the user is based on the video feed, while the body of the user is "cartoonized." The graphics engine 250 provides the display 300 for presentation on Jason's client device 110A and Brendan's client device 110B.

In some embodiments, the graphics engine 250 formats the display 300 differently for each client device 110. For instance, the display 300 shown in FIG. 3A includes the first sub-display 305 positioned above the second sub-display 310 and is presented on Brendan's client device 110B; however, another display presented on Jason's client device 110A (not shown in FIG. 3A) includes the second sub-display 310 positioned above the first sub-display 305. Further, in embodiments where the video conversation includes additional participating users, the display 300 may include a sub-display for each participating user, arranged in a grid pattern or any other suitable format. In some embodiments, the sub-display including the visual representation of the viewing user may be smaller in size relative to the sub-displays including the visual representations of the other participating users.

Figure 3B:
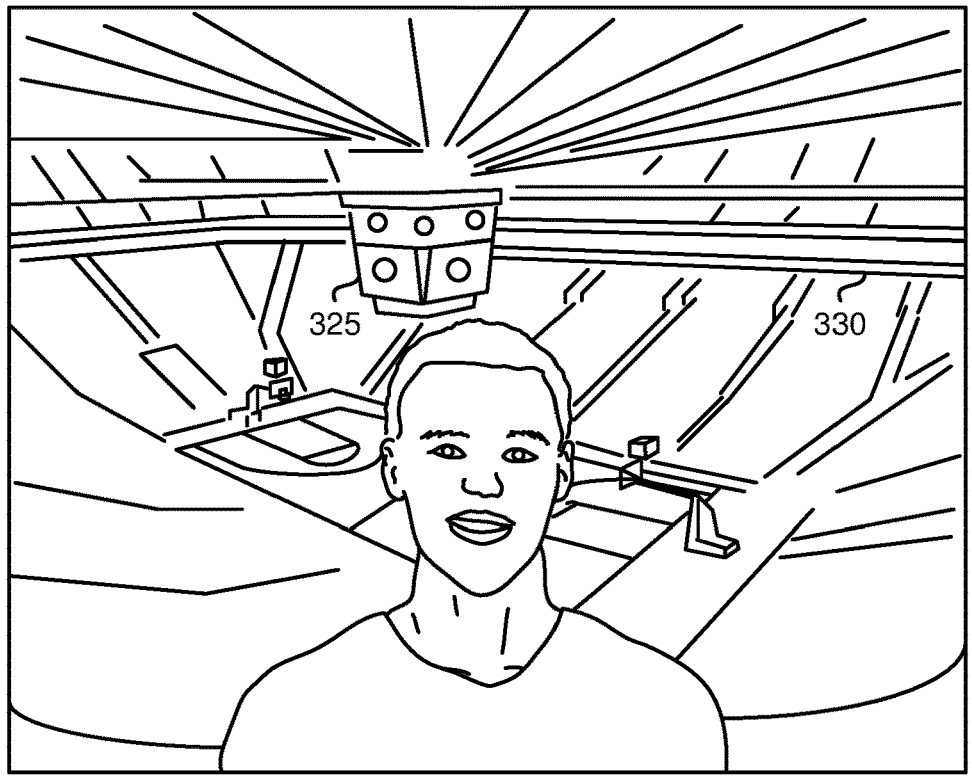
FIG. 3B is a diagram of a display of the video conversation shown in FIG. 3A including a background graphic according to one embodiment.
Figure 3B:

FIG. 3B is a diagram of the display 300 of the video conversation shown in FIG. 3A including a background graphic according to one embodiment. In an example use case, the graphics engine 250 determines that Jason and Brendan both have an interest in basketball. For instance, the graphics engine 250 receives user information from the action log 220 indicating that Jason and Brendan both commented on content (e.g., news articles or user posts) of the online system 100 associated with a local basketball team. In some embodiments, the graphics engine 250 includes a menu (e.g., including text, images, or video) of multiple options for a background graphic in the display 300, e.g., including options for a stadium of the local basketball team, an outdoors basketball court, or a basketball gym. The graphics engine 250 may include the menu in response to receiving a request for a background graphic via one of the client devices 110. In response to receiving a selection of a background graphic from the menu, the graphics engine 250 includes the selected background graphic in composite views presented by the client devices 110.

In the example shown in FIG. 3B, graphics engine 250 includes the selected background graphic of the stadium of the local basketball team in the composite view shown in the display 300. The composite view overlays the visual representation of Jason on the background graphic in the first sub-display 305 and overlays the visual representation of Brendan on the background graphic in the second sub-display 310. Since the background graphic visually represents the stadium, the composite view may provide a digital environment (e.g., an AR or VR environment) in which Jason and Brendan perceive them being located together at the stadium. Though the background graphic is generally identical as included in the composite views presented in the client devices 110 of each user participating in a video conversation, the graphics engine 250 may customize a portion of the background graphic.

For instance, the background graphic of the stadium includes a scoreboard 325 and a banner 330. Compared to the display presented to Jason, the display 300 presented to Brendan may have a different graphic shown in designated portions of the background graphic corresponding to the scoreboard 325 and/or the banner 330. For purposes of illustrating that designated portions of the same background graphic may be customized for different users, the scoreboard 325 shown in the first sub-display 305 includes circles, while the scoreboard 325 shown in the second sub-display 310 includes triangles. In practice, for example, the scoreboard 325 shown in the first sub-display 305 includes statistics of Jason's favorite basketball player, while the scoreboard 325 shown in the second sub-display 310 includes statistics of Brendan's favorite basketball player. In some embodiments, the scoreboard 325 shown in both sub-displays 305 and 310 are identical for a display presented by client device 110A, but different than the scoreboard shown in sub-displays presented by the client device 110B.

Figure 3C:
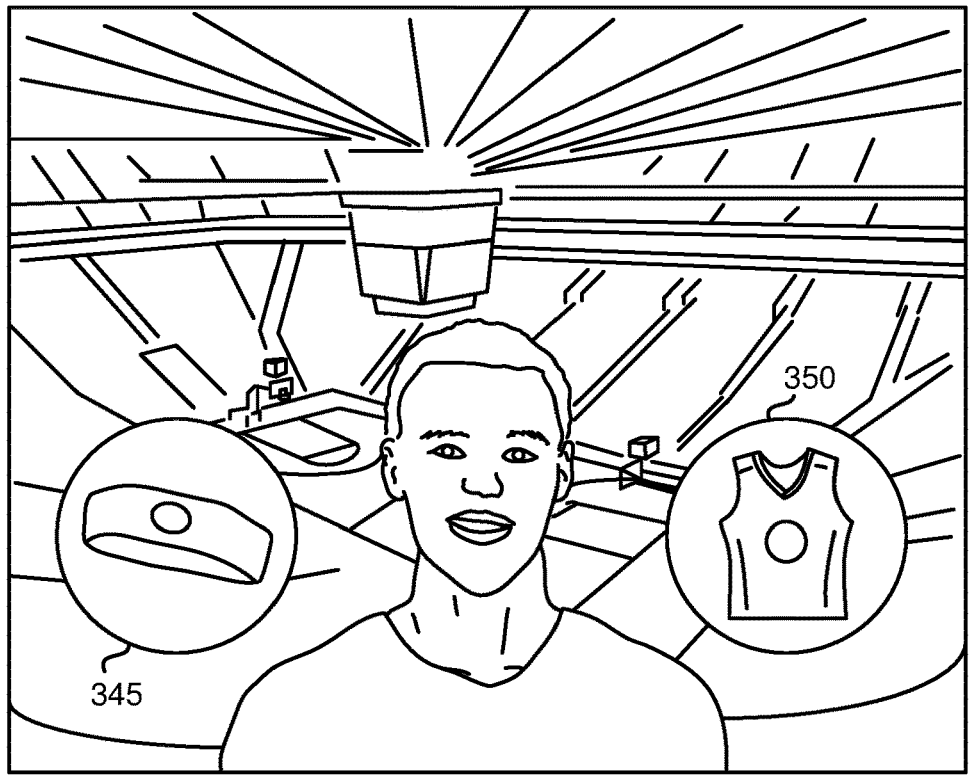
FIG. 3C is a diagram of a display of the video conversation shown in FIG. 3B including additional graphics according to one embodiment.
Figure 3C:
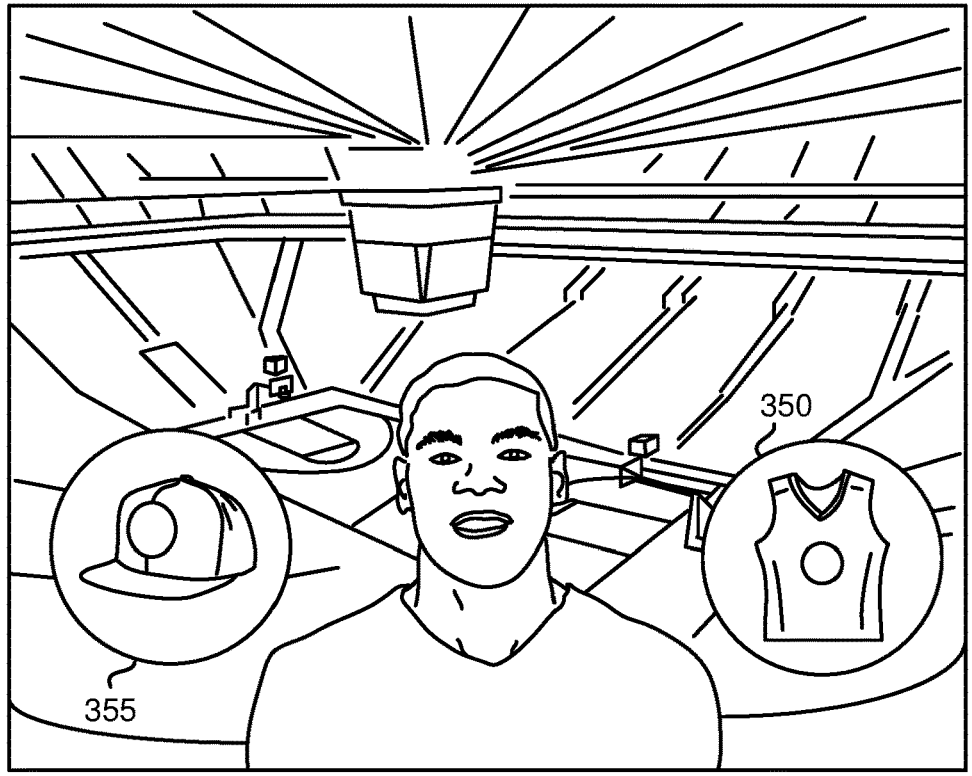

FIG. 3C is a diagram of the display 300 of the video conversation shown in FIG. 3B including additional graphics according to one embodiment. In the example shown in FIG. 3B, the first sub-display 305 includes a graphic of a headband 345 and a graphic of a jersey 350. The second sub-display 310 includes a graphic of a cap 355 and a graphic of the jersey 350. The graphics engine 250 modifies the composite view to overlay the additional graphics on the first sub-display 305 and the second sub-display 310. For purposes of illustration in FIG. 3C, each of the graphics is shown in a circular "bubble" overlaid on the background graphic. In other embodiments, the graphics engine 250 may include the graphics in the composite view in any suitable representation. In addition or alternatively to including the graphics, the graphics engine 250 may include a textual string representation of the graphics, e.g., displaying the strings "headband," "cap," and "jersey" as a menu in the composite view.

The graphics engine 250 can determine the additional graphics based on the background graphic. For instance, the headband 345, jersey 350, and cap 355 are basketball apparel that may be worn or found at a basketball stadium. Furthermore, the graphics for the headband 345, jersey 350, and cap 355 may be customized, e.g., include team colors or a logo of the local basketball team. Thus, the graphics engine 250 can generate different graphics for other users located in a different city with a basketball team different than the basketball team nearby Jason and Brendan. As another example use case, the background graphic shows a theme park. The graphics engine 250 determines graphics of masks (e.g., to be worn on the face or head) and props that are associated with a theme park environment. For instance, the graphics include masks of various movie characters, theme park food and drinks, or souvenirs.

The graphics shown in the first sub-display 305 are different than those shown in the second sub-display 310, e.g., because the graphics engine 250 determines one or more characteristics that differ between Jason and Brendan. For instance, the graphics engine 250 determines that Jason previously viewed a webpage including product information for headbands and that Brendan previously viewed a website including product information for caps, e.g., based on information from the third party tracker 235. Accordingly, the graphics engine 250 infers that Jason and Brendan have affinities for headbands and caps, respectively, and thus are likely to interact with objects related to headbands, caps, or other types of basketball apparel.

The graphics engine 250 updates the visual representation of users based on the real-time video feed of the users, in some embodiments. For instance, if a user raises the user's hand in real life, the graphics engine 250 detects this motion and updates the visual representation of the user to reflect the hand raise motion. Thus, users participating in the video conversation can interact with graphics or background graphics included in the composite view. For example, Jason selects the headband 345 by moving his hand over the graphic of the headband 345, and Brendan selects the cap 355 by moving his hand over the graphic of the cap 355.

Figure 3D:
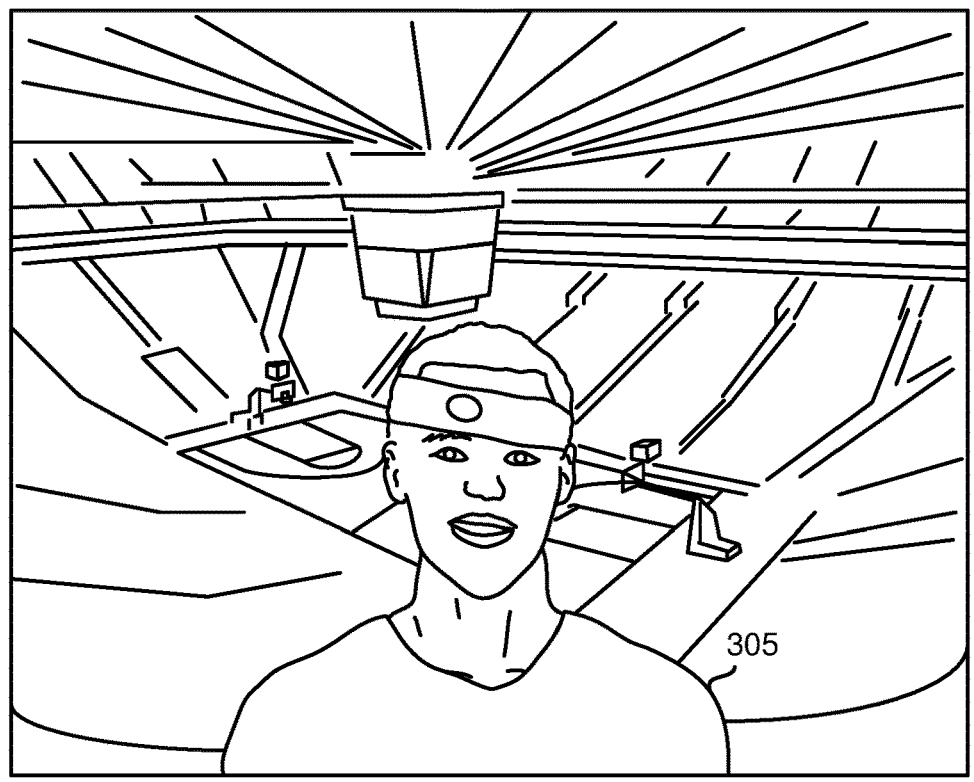
FIG. 3D is a diagram of a display of the video conversation shown in FIG. 3B showing the users interacting with additional graphics according to one embodiment.
Figure 3D:
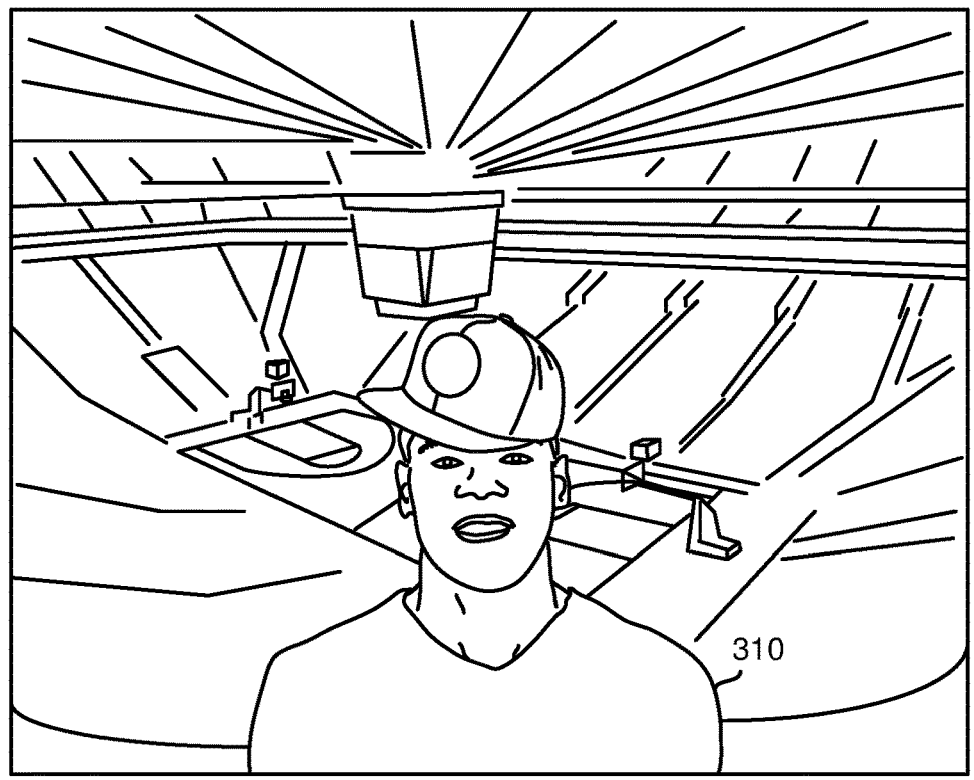

FIG. 3D is a diagram of the display 300 of the video conversation shown in FIG. 3B showing the users interacting with additional graphics according to one embodiment. As an example use case, in response to Jason interacting with the graphic of the headband 345, the graphics engine 250 modifies the composite view to overlay the graphic of the headband 345 on the visual representation of Jason shown in the first sub-display 305. In addition, in response to Brendan interacting with the graphic of the cap 355, the graphics engine 250 modifies the composite view to overlay the graphic of the cap 355 on the visual representation of Brendan shown in the second sub-display 310.

The graphics engine 250 may associate certain graphics with predetermined designated portions of visual representations of users (or of background graphics), in some embodiments. For example, headbands and caps are normally worn on people's heads, so the graphics engine 250 associates the graphics of the headband 345 and cap 355 with the designated portion of a head of a visual representation of a user in the video conversation. Thus, the graphics of the headband 345 and cap 355 are overlaid on the head of the visual representations of Jason and Brendan, respectively. As Jason and Brendan move their heads in real life, the video feed of their client devices 110 captures these movements, and the graphics engine 250 updates their visual representations in the composite view; the graphics engine 250 can also maintain the positions of the graphics of the headband 345 and cap 355 relative to the head of their visual representations.

In some embodiments, Jason and Brendan can interact with the graphics of the headband 345 and cap 355 overlaid on their heads in the composite view. For example, they can use their hands to adjust the orientation of the headband 345 or cap 355, or take off the headband 345 or cap 355. In some embodiments, a camera (or another sensor) of the client device 110 tracks motion of the hands of a user, and the online system 100 uses the tracked motion to determine the user's interactions with graphics. In other embodiments, the online system 100 can determine these user interactions using video and/or image processing techniques to identify and track motions from a video feed. Jason can Brendan may also swap the headband 345 and cap 355 with each other in the environment of the video conversation. In other embodiments, the graphics engine 250 overlays graphics of masks on designated portions of a face of a visual representation of a user, or overlays graphics of other props, clothing, or types of objects on any suitable portion of the visual representation of the user (e.g., a basketball on the user's hand, or a jersey on the user's upper body).

In other embodiments, the graphics engine 250 modifies the composite view presented on the client devices 110 by overlaying graphics on the designated portions of a background graphic. For example, the composite view includes graphics of several basketball players on the local basketball team. In response to Jason or Brendan selecting one of the graphics, the graphics engine 250 overlays statistics or other types of information about the corresponding basketball player on the scoreboard 325 of the background graphic. As another example, the graphics engine 250 overlays information about food and drinks available at the stadium (e.g., associated with a third party system 120 of a restaurant or snack booth) on the scoreboard 325 or banner 330 portions of the background graphic. The graphics engine 250 may also overlay graphics of the food and drinks available on a graphic of a tray, e.g., carried by a virtual food server at the stadium shown in the composite view.

IV. Example Process Flow

FIG. 4 is a flowchart illustrating a process 400 for customizing graphics for video conversations according to one embodiment. In some embodiments, the process 400 is performed by the online system 100—e.g., modules of the online system 100 described with reference to FIG. 2—within the system environment in FIG. 1. The process 400 may include different or additional steps than those described in conjunction with FIG. 4 in some embodiments or perform steps in different orders than the order described in conjunction with FIG. 4.

In one embodiment, the conversation engine 250 identifies 410 users of the online system 100 participating in a video conversation, where each user has a client device 110 presenting visual representations of one or more of the users. In response to receiving a selection from one of the users for a background graphic, and for each of the users, the graphics engine 250 provides 420 the background graphic to be included in a composite view presented by the corresponding client device 110 of the user. The composite view overlays the visual representations of the one or more users on the background graphic.

The graphics engine 250 determines 530 a first set of graphics for a first user of the users. Each of the graphics is associated with one or more designated portions of the composite view presented by the client device 110 of the first user. The graphics engine 250 provides 540 one or more graphics of the first set to be included in the composite view presented by the client device of the first user. In response to receiving an interaction performed by the first user with a graphic of the one or more graphics, the graphics engine 250 modifies 550 the composite view presented by the client device 110 of the first user. For instance, the graphics engine 250 overlays the graphic on the one or more designated portions of the composite view corresponding to the graphic.

In some embodiments, the graphics engine 250 determines a second set of graphics for a second user of the users. The second set of graphics may include at least a first graphic that is also included in the first set of graphics. The second set of graphics may also include at least a second graphic different than the first graphic. The graphics engine 250 may determine the sets of graphics by determining at least one characteristic that differs between the first user and the second user based on user information, e.g., from the user profile store 200 or action log 220.

V. Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    identifying a plurality of users of an online system participating in a video conversation, each user having a client device presenting visual representations of one or more users of the plurality of users;
    in response to receiving a selection from a first user of the plurality of users for a background graphic for the video conversation, providing the background graphic to be included in a composite view presented by the corresponding client device of the first user, the composite view overlaying the visual representations of the one or more users of the plurality of users on the background graphic;
    determining user action information describing actions performed on the online system by the first user on social networking objects different from a video feed associated with the video conversation;
    retrieving, from the online system, user profile information associated with the first user;
    automatically determining a first plurality of graphics for the first user, each of the first plurality of graphics determined based on the following:
        the determined user action information; and
        a different characteristic between the first user and another user participating in the video conversation determined based on the retrieved user profile information; and
    providing one or more graphics of the first plurality of graphics to be included in the composite view presented by the client device of the first user.

2. The method of claim 1, further comprising:
    receiving user information describing actions performed by the plurality of users on the online system; and
    determining a common characteristic of the plurality of users based at least in part on the user information;
    wherein the received selection is from a set of candidate background graphics, and wherein at least one of the set of candidate background graphics is determined based on the common characteristic.

3. The method of claim 2, wherein determining the common characteristic of the
    plurality of users based at least in part on the user information comprises:
        determining a geographical location visited by each of the plurality of users, wherein the background graphic visually represents the geographical location.

4. The method of claim 1, further comprising:
    in response to receiving an interaction performed by the first user with a graphic of the first plurality of graphics, modifying the composite view presented by the client device of the first user by overlaying the graphic on one or more designated portions of the composite view corresponding to the graphic.

5. The method of claim 4, wherein modifying the composite view presented by the
    client device of the first user further comprises:
        modifying at least one of the visual representations of the one or more users of the plurality of users based on the graphic.

6. The method of claim 4, wherein the one or more designated portions of the composite
    view are part of the background graphic, and wherein modifying the composite view responsive to the interaction further comprises:
        modifying the background graphic by including the graphic in the background graphic.

7. The method of claim 1, wherein at least one of the first plurality of graphics includes
    sponsored content of a third-party system.

8. The method of claim 7, wherein automatically determining the first plurality of
    graphics comprises determining that the first user interacted with one or more social networking objects associated with the third-party system.

9. The method of claim 1, wherein the background graphic is selected from a set of
    candidate background graphics based on targeting criteria of the candidate background graphics and characteristics of one or more users of the plurality of users.

10. The method of claim 4, further comprising:
  determining an impression opportunity for a designated portion of the one or more designated portions of the composite view;
  receiving a plurality of graphic values from a plurality of third-party systems;
  selecting a graphic value of the plurality of graphic values, wherein the selected graphic value corresponds to a third-party system of the plurality of third party systems; and
  including a candidate graphic provided by the third-party system in the one or more graphics of the first plurality of graphics.

11. A non-transitory computer-readable storage medium storing instructions for generating information for removing an unwanted application, the instructions when executed by a processor cause the processor to perform steps including:
  identifying a plurality of users of an online system participating in a video conversation, each user having a client device presenting visual representations of one or more users of the plurality of users;
  in response to receiving a selection from a first user of the plurality of users for a background graphic for the video conversation, providing the background graphic to be included in a composite view presented by the corresponding client device of the first user, the composite view overlaying the visual representations of the one or more users of the plurality of users on the background graphic;
  determining user action information describing actions performed on the online system by the first user on social networking objects different from a video feed associated with the video conversation;
  retrieving, from the online system, user profile information associated with the first user;
  automatically determining a first plurality of graphics for the first user, each of the first plurality of graphics determined based on the following:
    the determined user action information; and
    a different characteristic between the first user and another user participating in the video conversation determined based on the retrieved user profile information; and
  providing one or more graphics of the first plurality of graphics to be included in the composite view presented by the client device of the first user.

12. The non-transitory computer-readable storage medium of claim 11, wherein the instructions when executed further cause the processor to perform steps including:
  receiving user information describing actions performed by the plurality of users on the online system; and
  determining a common characteristic of the plurality of users based at least in part on the user information;
  wherein the received selection is from a set of candidate background graphics, and wherein at least one of the set of candidate background graphics is determined based on the common characteristic.

13. The non-transitory computer-readable storage medium of claim 12, wherein determining the common characteristic of the plurality of users based at least in part on the user information comprises:
  determining a geographical location visited by each of the plurality of users, wherein the background graphic visually represents the geographical location.

14. The non-transitory computer-readable storage medium of claim 11, wherein the instructions when executed further cause the processor to perform steps including:
  in response to receiving an interaction performed by the first user with a graphic of the first plurality of graphics, modifying the composite view presented by the client device of the first user by overlaying the graphic on one or more designated portions of the composite view corresponding to the graphic.

15. The non-transitory computer-readable storage medium of claim 14, wherein modifying the composite view presented by the client device of the first user further comprises:
  modifying at least one of the visual representations of the one or more users of the plurality of users based on the graphic.

16. The non-transitory computer-readable storage medium of claim 14, wherein the one or more designated portions of the composite view are part of the background graphic, and wherein modifying the composite view responsive to the interaction further comprises:
  modifying the background graphic by including the graphic in the background graphic.

17. The non-transitory computer-readable storage medium of claim 11, wherein at least one of the first plurality of graphics includes sponsored content of a third-party system.

18. The non-transitory computer-readable storage medium of claim 17, wherein automatically determining the first plurality of graphics comprises determining that the first user interacted with one or more social networking objects associated with the third-party system.

19. The non-transitory computer-readable storage medium of claim 11, wherein the background graphic is selected from a set of candidate background graphics based on targeting criteria of the candidate background graphics and characteristics of one or more users of the plurality of users.

20. The non-transitory computer-readable storage medium of claim 14, wherein the instructions when executed further cause the processor to perform steps including:
  determining an impression opportunity for a designated portion of the one or more designated portions of the composite view;
  receiving a plurality of graphic values from a plurality of third-party systems;
  selecting a graphic value of the plurality of graphic values, wherein the selected graphic value corresponds to a third-party system of the plurality of third party systems; and
  including a candidate graphic provided by the third-party system in the one or more graphics of the first plurality of graphics.

* * * * *